2,811,488

LOST CIRCULATION

Alfred C. Nestle, Houston, Tex., and Victor J. Tronolone, Downey, Calif., assignors to The Texas Company, New York, N. Y., a corporation of Delaware No Drawing. Application June 28, 1954, Serial No. 439,905

4 Claims. (Cl. 252—8.5)

This invention relates to well drilling. More particularly, this invention relates to a material and a method for correcting and/or preventing lost circulation of drilling fluid during well drilling operations.

In the drilling of wells a drilling fluid is continuously circulated from the surface of the ground to the bottom of the hole, through the drilling bit, and back to the surface again for the purpose of lubricating the drill bit and drill string, cooling the drill bit, removing the cuttings from the bottom of the hole to the surface of the ground, and to provide sufficient hydrostatic pressure in order to hold loosely consolidated caving formations in place, and to impose a hydrostatic pressure upon the formations penetrated by the well bore in order to prevent the escape of oil, gas or water therefrom to the well bore during drilling operations. When drilling through shale or porous or fractured formations or other formations having a relatively high porosity or permeability to drilling fluid a condition known as lost circulation or lost returns is sometimes encountered. When lost circulation occurs, the drilling fluid employed in the drilling operation flows into the relatively porous formation with the resultant loss of drilling fluid. In certain instances the loss of drilling fluid is so great that all but a minor amount of the drilling fluid pumped into the well bore is lost into the porous formation. In some instances the loss of drilling fluid is so severe as to warrant cessation of drilling until the condition can be corrected and even in some instances, abandonment of the drilling operations.

Various materials and methods have been suggested to correct and/or prevent lost circulation. Various types of fibrous sealing materials have been added to the drilling fluid in order to prevent and/or correct lost circulation. These materials, however, may form a loosely adherent barrier or seal (wall scab) along the wall of the well bore at the zone of lost circulation which in place prevents lost circulation but which is easily dislodged by the running in and out of the drilling tools. Certain other materials tend to plug the lost circulation zone or formation tightly in depth. This result is definitely objectionable if lost circulation occurs within the producing zone itself.

It is an object of this invention to provide an improved material and method for controlling and/or preventing lost circulation.

It is another object of this invention to provide a material suitable for overcoming lost circulation, which material is readily available in relatively large quantities and at relatively low cost.

It is yet another object of this invention to provide a material and method employing the same for quickly overcoming lost circulation.

These and other objects of this invention and how they are accomplished will become apparent with reference to the accompanying disclosure.

In accordance with this invention it has now been discovered that a material comprising a fibrous material and an inorganic granular material is particularly effective for preventing and/or overcoming lost circulation. Preferably the admixture of fibrous material and particulate granular material contains these components in approximately the proportions 15:125 by weight.

In accordance with this invention, lost circulation of a drilling fluid is prevented and/or corrected by admixing with the drilling fluid the above-mentioned materials, either in admixture or separately, for example, a fibrous material such as fibrous ground leather and a mineral granular material such as Ottawa sand, and pumping the resulting mixture through the well bore to contact the zone of lost circulation. The admixture of fibrous material and mineral granular material penetrates into the porous or permeable lost circulation zone a sufficient distance to form an effective seal to the flow of drilling fluid into the lost circulation zones without the build-up of a thick filter cake on the walls of the well bore at the zone of lost circulation thereby avoiding freezing of the drill string. It is envisaged that the mixture of fibrous material and mineral granular material forms a substantially impermeable mat around the well bore at the zone of lost circulation. The granular material penetrates the porous or lost circulation zone and tends to plug the large openings thereof. The resulting openings of the plugging granular material are small enough to retain the fibrous material so that a mat is eventually formed. The formed mat usually has a permeability in the order of 10–100 darcys, more or less. Generally the pores of the resulting mat are so small that a bentonite-water mud forms a mud cake thereon, thereby effectively sealing and stopping mud loss through the mat. Mud cake formation is necessary to effect a seal which will stop mud loss. Generally a seal may be defined as being a mud-cake on a mat. A seal usually has a permeability less than 10 microdarcys. It is also desirable that the seal be formed as quickly as possible in order to prevent mud loss which is not only undesirable, per se, but which might also tend to plug or damage the formations traversed by the well bore. As indicated hereinbefore, should the lost circulation zone occur in the pay zone, any damage to the pay zone is definitely undesirable.

Fibrous materials which are suitable in the practice of this invention include such materials as fibrous shredded wood products, fibrous ground leather, and fibers of animal, vegetable or synthetic origin. It is preferred that the fibrous material tend to swell when wet and that the average length of the fibers in the fibrous material be no longer than about 4 inches and no shorter than about ⅛–¼ inch. Fibrous materials which are suitable include such materials as fibrous wood, fibrous tree bark, e. g., redwood bark and Douglas Fir bark, wool shoddy, chicken feathers, sugar cane fibers, cottonseed and oat hulls, rabbit fur, cotton linters, nylon fibers, rayon fibers, Dacron fibers, mohair, jute, ground leather, fibrous tree bark, fibrous shredded wood, glass fibers, asbestos fibers, mineral wool or so-called rockwool. The fibrous material preferably should be hair-like in form and when pressed together in the dry or wet state should tend to mat or form a feit-like material. Suitable fibrous materials for use in the admixture of this invention are readily available and are sold under the trade name Simpson Treewool, a shredded fibrous wood product, sold by Van Waters and Rogers, Inc., Seattle, Washington; Silvacel and Silvaflake, fibrous shredded wood products sold by the Weyerhaeuser Timber Co., Longview, Washington; and Fiber-Seal and Fibertex, fibrous wood products, sold by the National Lead Company, Houston, Texas; Leather-Floc, a fibrous ground leather, sold by Magnet Cove Barium Corp., Houston, Texas; Kingseal and Queenseal, shredded fibrous wood and cloth products sold by W. E. Sievers Co., Long Beach, California.

Any relatively non-friable, inorganic mineral aggregate or granular material is suitable in forming the admixture compositions of this invention. It is preferred that the mineral granular material having a size in the range 10–100 mesh, preferably in the range 20–30 mesh. Particularly suitable mineral granular materials are Ottawa sand and expanded perlite. Expanded perlite is sold under the trade name Strata-Seal by the Great Lakes Carbon Corp., Long Beach, California; Panaseal by the National Lead Company, Houston, Texas; Circ-U-Lite by F. M. Carlisle and Associates, Whittier, California. Other suitable inorganic granular materials include crushed rock or gravel in the desired size range, glass bits or chips, ceramic frit, and even metal shot or chips.

The materials of this invention, either in admixture with each other or separately, may be added to the drilling fluid within the mud pit itself, or at the inlet to the mud pump, or at any other suitable place. When the materials are added to the drilling fluid in rather large quantities, agitation of the drilling fluid together with the materials added thereto is desirable and helpful in order to prevent lumping of the added materials and to obtain a better dispersion of the added materials within the drilling fluid. A most effective admixture for correcting lost circulation has been found to be a uniform admixture of fibrous ground leather and sand, e. g., Leather-Floc and Ottawa sand (20–30 mesh), preferably in the weight ratio 1:7–9, respectively.

The added material in accordance with our invention may be considered predominantly curative rather than preventative with respect to lost circulation. A preventative material may be defined as a material suitable for preventing lost circulation by being continuously circulated with the drilling fluid. A curative material may be defined as a material employed for overcoming lost circulation or regaining circulation which is added to the drilling fluid substantially only at the time lost circulation occurs or when it is anticipated lost circulation will occur. The fibrous material of this invention may be continuously circulated with the drilling fluid. It is preferred, however, in the practice of this invention that the inorganic granular material be added to the drilling fluid either alone or in admixture with the fibrous material only at the time lost circulation occurs or when it is anticipated lost circulation will occur.

The materials in accordance with this invention are added to the drilling fluid in the amounts necessary to effectively seal off the lost circulation zone. It is realized that the required amounts will vary depending upon the drilling fluid composition, drilling requirements, the thickness, permeability and porosity of the formations traversed by the well bore and giving rise to lost circulation. Preferably the materials are added to the drilling fluid in amounts such that the total amount of added material present in the drilling fluid is in the range 20–200 pounds per barrel of drilling fluid, more preferably in the range 30–150 pounds per barrel. Particularly outstanding results have been obtained when 15 pounds of fibrous leather, such as Leather-Floc, and 125 pounds of Ottawa sand (20–30 mesh) are added per barrel of drilling fluid.

The drilling fluid employed in the practice of this invention may be any of the conventional drilling fluids e. g., water-base, oil-in-water, water-in-oil and oil-base fluids, which contain a clayey mud and/or solid, particulate weighting agents.

Table No. I

[Mud [1]: California Stock: Rogers Lake—McKittrick Light 1:1 30±2 cp. at 600 R. P. M.; about 71 lbs./cu. ft.]

| Additive Material | Additive Concentration, Lbs./bbl. | Total Mud Lost,[2] grams | Mud Spurt,[3] grams | Filtration Loss,[4] grams | Remarks [5] |
|---|---|---|---|---|---|
| Additive A, a ground fibrous leather, Ottawa sand (20–30 mesh). | 15 / 125 | 105 | 70 | 35 | Mat appeared to be in depth of bed. Cake on top was approximately ⅛ in. thick. Sealed in approx. 3 secs. |
| Additive A | 15 | 170 | 120 | 50 | Mat appeared to be in depth of bed. Mat about ¼ inch thick on top of bed. Sealed in less than 5 secs. Soft cake on top of mat too soft to measure. |
| Additive B, a fibrous wood product | 7.5 | | | | |
| Additive A | 7.5 | 280 | 165 | 115 | Mat and cake as described in entry preceding. Sealed in 7 secs. |
| Additive B | 7.5 | | | | |
| Additive A | 5 | 255 | 190 | 65 | Mat and cake as described above. Sealed in 10 seconds. Mat thickness ½ inch. |
| Additive B | 7.5 | | | | |
| Additive A | 7.5 | 250 | 190 | 60 | Mat and cake as described above. Sealed in 7 seconds. Mat thickness ½ inch. |
| Additive B | 5.0 | | | | |
| Additive A | 3.75 | 340 | 230 | 110 | Mat and cake as described above. Sealed in 8 seconds. Mat thickness ½ inch. |
| Additive B | 3.75 | | | | |
| Additive C, an expanded perlite | 15 | 200 | | | Sealed in 13 secs. Formed a mat ⅛ inch thick. |
|  | 7.5 | 184 | | | Sealed in 6 secs. Formed a mat ⅛ inch thick. |
|  | 5.0 | 423 | | | Sealed in 25 secs. Formed a mat ⅛ inch thick. |
| Additive D, an expanded perlite | 15 | 287 | | | Sealed in 20 secs. Formed a mat ⅛ inch thick. |
|  | 7.5 | 389 | | | Do. |
|  | 5.0 | 608 | | | Do. |
| Additive E, an expanded perlite | 15 | 294 | | | Sealed in 13 secs. Formed a mat ⅛ inch thick. |
|  | 7.5 | 427 | | | Sealed in 25 secs. Formed a mat ⅛ inch thick. |
|  | 5.0 | | | | Went through bed in 15 secs. and formed a mat ⅛ inch thick. |
| Additive B | 15 | 335 | | | Sealed in 50 secs. Formed a mat 1 inch thick. |
|  | 7.5 | 324 | | | Sealed in 10 secs. Formed a mat 1 inch thick. |
|  | 5.0 | | | | Went through bed in 6 secs. and formed a mat ¼ inch thick. |
| Chicken feathers | 15 | 340 | | | Sealed in 27 secs. Formed a mat ¾ inch thick. |
|  | 7.5 | 295 | | | Sealed in 20 secs. Formed a mat ¾ inch thick. |
|  | 5.0 | 350 | | | Sealed in 15 secs. Formed a mat ¼ inch thick. |
| Additive F, a fibrous wood product | 15 | 337 | | | Sealed in 60 secs. Formed a mat 1¼ inch thick. |
|  | 7.5 | 635 | | | Sealed in 60 secs. Formed a mat 1¼ inch thick. |
|  | 5.0 | | | | Went through bed in 4 secs. and formed a mat ½ inch thick. |
| Additive G, a fibrous wood product | 15 | 335 | | | Sealed in 60 secs. Formed a mat 1¼ inch thick. |
|  | 7.5 | | | | Went through bed in 15 secs. and formed a mat 1 inch thick. |
| Additive H, a fibrous wood product | 15 | | | | Went through bed in 4 secs. and formed a mat 2 inches thick. |
| Additive J, a mixture of treated wood fibers and short cloth fibers. | 15 | | | | Went through bed in 20 secs. and formed a mat 1¼ inches thick. |
| Additive K, a mixture of short cloth fibers and sawdust. | 15 | | | | Went through bed in 18 secs. and formed a mat 1 inch thick. |
| Additive A | 15 | | | | Went through bed in 2 secs. and no mat was formed. |

[1] API Code 29 prescribes 5 to 8% by weight suspension of Wyoming type bentonite, 30±2 centipoises viscosity, properly aged.
[2] Total mud lost in thirty minutes, the sum of the mud spurt and filtration losses.
[3] Mud spurt, weight mud through BB bed before mud-cake established, before strained-out additive "mats" on the BB bed and forms pores sufficiently small to permit the carrier fluid (mud) to form mud-cake on the mat, initiate normal filtration and thereby effect a "seal," stopping mud loss.
[4] Filtration loss: weight fluid (mud and/or water) through the BB bed between inception of "dropwide filtration" or dropwise flow and until thirty minutes from the start of the test.
[5] Remarks: Time to effect a seal, character or nature of mat and/or seal, mud-cake, etc.

The effectiveness of the materials of this invention for regaining circulation or preventing lost circulation has been demonstrated by accepted conventional laboratory tests. Tests of the materials of this invention which demonstrate their superiority over other materials were carried out on a modified apparatus designed for evaluating materials for regaining circulation and described in API code R. P. 29, third edition, May 1950. In accordance with this test a 1½ inch layer of copper-plated BB shot (0.173-inch diameter spheres) is formed by pouring 800 grams of the shot into a cell so that a bridge across the ¼-inch holes is effected during sealing. This gives a filter bed having a porosity of approximately 35 percent and a permeability of approximately 70,000 darcys. Untreated mud is then poured on the filter bed in order to fill all void spaces, to wet all the surfaces of the shot and to just cover the bed of shot. An 800 ml. sample of mud of 30±2 centipoises viscosity is prepared. A weighed sample of the sealing material to regain circulation or to prevent lost circulation which is to be evaluated is added to the mud and the resulting mixture stirred thoroughly. The treated mud is then added to the above-identified testing apparatus. A pressure of 100 p. s. i. is applied to the mud being tested. When the pressure has reached its maximum value, the quick-opening valve of the test apparatus is fully opened. Usually the test is of 30 minutes duration unless no seal-off is obtained. Both the volume of mud that passes through porous medium bed before a seal-off is accomplished and the volume obtained by normal filtration are measured and recorded. The thickness and character of the sealing material mat build-up upon the BB shot filter bed is also noted and recorded. The results of the tests are set forth in Table 1.

It is to be observed as indicated by the test data set forth in Table 1 that an admixture of a fibrous material and an inorganic granular material in accordance with this invention effected a seal in the shortest time of any of the materials tested. Additionally a mud cake of only about ⅛ inch thickness was formed. It is also to be observed that the lost circulation correcting admixture in accordance with this invention achieved the lowest total mud loss, mud spurt loss and filtration loss of all the materials tested.

Many substitutions and modifications are possible in the practice of this invention without departing from the spirit and scope thereof.

We claim:

1. A composition of matter suitable for use in a drilling fluid for correcting lost circulation comprising an admixture of fibrous, ground leather and Ottawa sand having a size range in the range 20–30 mesh, said fibrous leather and said sand being present in the admixture in the weight ratio range 1:7–9, respectively.

2. A composition of matter suitable for use in a drilling fluid thereto for correcting lost circulation comprising an admixture of fibrous, ground leather and Ottawa sand having a size range in the range 20–30 mesh, said fibrous leather and said sand being present in the weight ratio 15:125, respectively.

3. A method for correcting lost circulation of a drilling fluid during drilling of a well bore comprising admixing with said drilling fluid fibrous, ground leather and Ottawa sand having a size range in the range 20–30 mesh, said fibrous leather and said Ottawa sand being present in said drilling fluid in the weight ratio range 1:7–9, and pumping the resulting mixture through said well bore to contact the lost circulation zone within said well bore.

4. A method for correcting lost circulation of drilling fluid during drilling of a well bore comprising admixing with said drilling fluid fibrous, ground leather and Ottawa sand having a size range in the range 20–30 mesh, said fibrous leather and said Ottawa sand being present in said drilling fluid in the amounts 15 and 125 lbs. per barrel of drilling fluid, respectively, and pumping the resulting mixture through said well bore to contact the lost circulation zone within said well bore.

References Cited in the file of this patent

UNITED STATES PATENTS

| | | |
|---|---|---|
| 2,561,075 | Sidwell | July 17, 1951 |
| 2,599,745 | Campbell et al. | June 10, 1952 |
| 2,626,779 | Armentrout | Jan. 27, 1953 |
| 2,634,236 | Simon et al. | Apr. 7, 1953 |
| 2,648,522 | Armentrout | Aug. 11, 1953 |

OTHER REFERENCES

Sidwell: Trends in Combating Lost Circulation, article in World Oil, November 1949, pages 123, 124, 128 and 130.